Patented Apr. 29, 1952

2,594,935

UNITED STATES PATENT OFFICE 2,594,935

DIHALOGENO PROPENYL ARYL ETHERS

Elbert C. Ladd and Merlin P. Harvey, Passaic, N. J., assignors to United States Rubber Company, New York, N. Y., a corporation of New Jersey No Drawing. Application April 8, 1948, Serial No. 19,888

4 Claims. (Cl. 260—612)

The invention relates to a new class of compounds, referred to as 3,3-dihalogeno-2-propenyl ethers and thioethers, having the type formula $X_2C=CR-CR'R''-M-R^*$ wherein each X is fluorine, chlorine or bromine; R and R' are radicals selected from the class of hydrogen, methyl, ethyl, halomethyl (e. g., chloromethyl), phenyl, acid groups and derivatives hydrolyzable to acid groups (e. g., carboxyl, carbalkoxy, carbaryloxy, carbaralkoxy, carbamyl, carbanhydro, carbonitrilo, methoxysulfonyl, and diethylphosphone), carboxyalkyl and the corresponding hydrolyzable derivatives (e. g., carboxymethyl, carbonitrilomethyl) or R and R' may together constitute an ethylene, trimethylene or tetramethylene group; R'' is R' or alkyl (e. g., methyl, ethyl, propyl, isopropyl, butyl, amyl, cyclopentyl, hexyl, cyclohexyl, heptyl, octyl, nonyl and decyl), alkenylalkyl (e. g., 3-butenyl), 4-cyclohexenyl, aryl (e. g., phenyl, tolyl, xylyl, naphthyl, xenyl, p-chlorophenyl, o,p - dichlorophenyl, p - methoxyphenyl, and p-fluorophenyl), aralkyl (e. g., benzyl, phenethyl), acidoxy (e. g., acetoxy, propionoxy, benzoyloxy, methylsulfato, diethylphosphato and trimethylsilicato), acidoxyalkyl (e. g., acetoxymethyl), acidyl (e. g., acetyl, propionyl benzoyl and methylsulfonyl), acidyl alkyl (e. g., acetylmethyl), alkoxy (e. g., methoxy, ethoxy, 2-ethoxy-ethoxy, propoxy, isopropxy, butoxy, sec.-butoxy, amyloxy, hexoxy, heptoxy, octoxy, nonoxy and decyloxyl), alkoxyalkyl (e. g., ethoxymethyl), alkenylalkoxy (e. g., 2-propenoxy), aryloxy (e. g., phenoxy, p-chlorophenoxy), aralkoxy (e. g., benzyloxy), and the corresponding thioether and thioester groups; $R^*$ is a hydrocarbon or substituted hydrocarbon radical from the class of alkyl, alkylene (e. g., ethylene, trimethylene), alkenylalkyl, aryl, arylene (e. g., phenylene), and aralkyl groups as in the definition of R''. At least one of R, R' and R'' is preferably hydrogen. R is always hydrogen when R' and R'' are hydrogen.

The new compounds of our invention can be readily prepared by simply mixing a 1,3,3-trihalogeno-2-propenyl compound $$X_2C=CR-CR'R''-Y$$

where Y is bromine and when each X is chlorine or fluorine Y may also be chlorine, with at least one, and preferably, from one to five molar equivalents of a compound containing from one to six hydroxyl or thiol groups from the class of water, hydrogen sulfide, and compounds having the general formula $R^*(MH)_z$, where $R^*$ is as defined above, M is oxygen or sulfur, and z is an integer from 1 to 6, said compounds being alcohols, glycols, higher polyols, thiols, and polythiols. The ensuing reactions are so markedly exothermic as to often require cooling or incremental addition of one of the reactants in order to maintain an adequate degree of control, and hence only moderate heating, if any, is ever required to complete the reactions, temperatures of 40–100° C. being sufficient. Moreover, these reactions are extremely rapid, and 0.1 of an hour or less may be a sufficient amount of time to secure an adequate degree of reaction, and reaction times in excess of 24 hours are seldom, if ever, necessary. The reactions are preferably conducted in the presence of from one to two molar equivalents or more of basic substances, particularly inorganic bases including the alkali metal and alkaline earth metal carbonates and hydroxides, the latter being preferred, e. g., sodium hydroxide and potassium hydroxide. Alternatively, the alkali metal hydroxides, mercaptides, sulfides, and alcoholates or thiolates of the $R^*(MH)_z$ compounds defined above, can be reacted directly with the polyhalogenoolefinic compound in the presence or absence of a diluent such as ethanol or diethyl ether. The products are isolated from the reaction mixture by the usual expedients such as filtration, extraction, fractional distillation and crystallization.

The reactivity at the 1,3,3-trihalogeno-2-propenyl starting materials, $X_2C=CR-CR'R''-Y$, in the reaction of our invention is unexpectedly great in comparison with even closely homologous compounds, e. g., the 1,4,4-trihalogeno-3-butenyl compounds and hence the former are both economically and technically preferable by a wide margin.

The polyhalogenoolefinic starting materials employed in our invention are in the main readily available through the selective and partial dehydrohalogenation of compounds of the type formula $X_3C-CHR-CR'R''-Y$ where X is fluorine, chlorine or bromine, and Y is X or iodine. These are the 1:1 adducts resulting from the free-radical-catalyzed, e. g., by peroxide, reaction of an olefinic compound $RHC=CR'R''$ with from 1 to 20 molar equivalents of a tetrahalogenomethane, $CX'_3Y'$ where each X' and Y' is chlorine or bromine, Y' being chlorine only when each X' is chlorine. Such products or the dehydrohalogenated derivatives can be treated with appropriate fluorinating agents, e. g., $SbF_3Cl_2$ to secure the analogous fluoro compounds (i. e., X' and/or Y' then fluorine). Similarly Y' can be converted to iodides by reaction with sodium iodide.

The preparation of these starting materials and their use in our invention can be illustrated as follows:

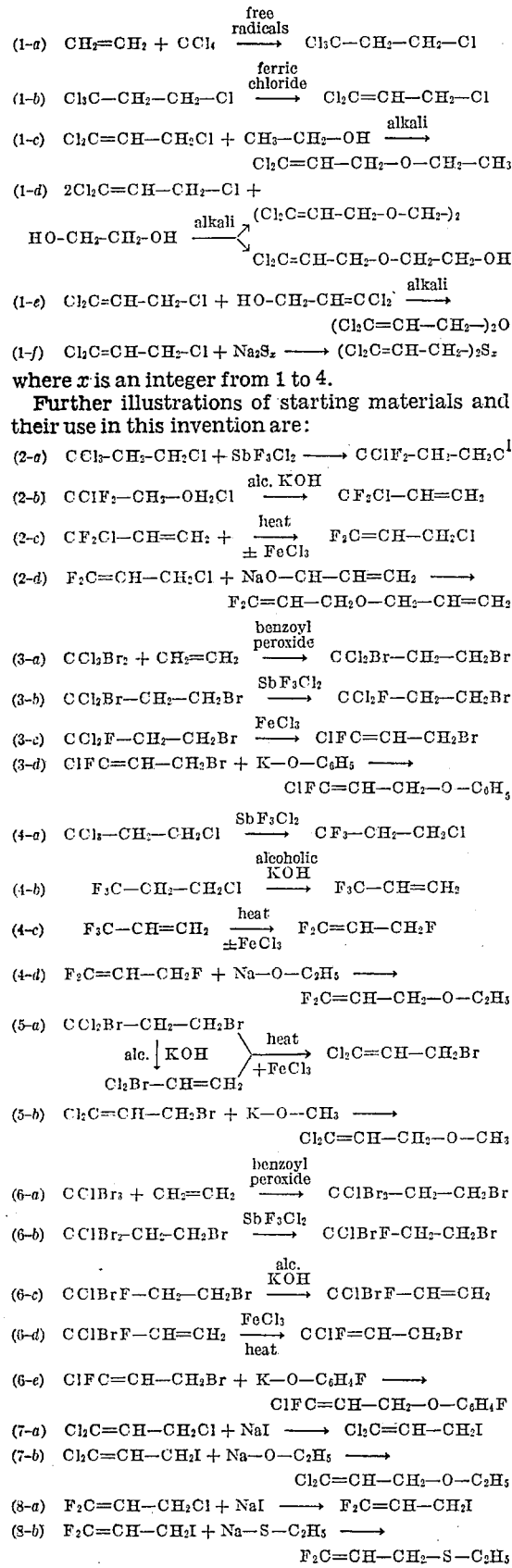

where $x$ is an integer from 1 to 4.

Further illustrations of starting materials and their use in this invention are:

Among the new compounds of our invention the following classes are preferred.

Class A. $(X_2C=CH-CH_2-M-)_zR^*$
Class B. $(Cl_2C=CH-CH_2-M-)_zR^*$
Class C. $(X_2C=CH-CH_2-)_2M$ These new compounds are useful as synthetic intermediates, e. g., $$Cl_2C=CH-CH_2-O-C_2H_5 \xrightarrow{H_2O} HOOC-CH_2-CH_2-O-C_2H_5$$

a vitamin $B_1$ intermediate. They are likewise useful as solvents, flame-retardant chemicals, polymerization regulators and in the preparation of lube-oil additives, plasticizers and polymeric materials. The fluorine-containing compounds of our invention are also useful as heat-transfer media.

The following examples disclose our invention in more detail. All parts are by weight.

Example 1

A solution of 33 parts of 85% potassium hydroxide dissolved in about 120 parts of 95% ethanol was added drop-wise and with vigorous agitation to 72.7 parts of 1,1,3-trichloropropene at 25° C. After addition of the solution was complete, the reaction mixture was heated at reflux for 0.75 hour, cooled and filtered to remove the precipitated sodium chloride. The filtrate was diluted with 2 volumes of water and the non-aqueous layer was separated and dried over calcium chloride. Fractional distillation yielded 30.9 parts of 3,3-dichloro-allyl ethyl ether, b. 90–92° C./103 mm.; $n_D^{20}$ 1.4555.

*Analysis.*—Theory, 45.78% chlorine; found, 45.85%.

(a) In an analogous manner 3,3-dichlorallyl methyl ether was prepared, b. 72.5–74.5° C./103 mm.; $n_D^{20}$ 1.4580;

$$d_{20}^{20} 1.2234$$

*Analysis.*—Theory, 50.32% chlorine; found, 50.01%.

(b) Allyl 3,3-dichloroallyl ether, b. 110–111° C./103 mm.; $n_D^{20}$ 1.4727;

$$d_{20}^{20} 1.1590$$

*Analysis.*—Theory, 42.48% chlorine; found, 42.74%.

Example 2

An ethanol solution of sodium p-chlorophenoxide was prepared by adding 64.28 parts of p-chlorophenol to a sodium ethoxide solution prepared from 11.5 parts of sodium and 160 parts of absolute ethanol. The solution was added drop-wise with stirring to 79.96 parts of 1,1,3-trichloropropene at 25° C. The reaction was exothermic and, after addition of the solution was complete, the reaction mixture was heated at reflux for 4 hours. The reaction mixture was then cooled, filtered, diluted with 2 volumes of water and the non-aqueous layer was separated. After drying, the latter was fractionally distilled to yield 15.5 parts of 3,3-dichloroallyl p-chlorophenyl ether, b. 121–2° C./3 mm.; $n_D^{20}$ 1.5630.

*Analysis.*—Theory, 44.78% chlorine; found 44.36%.

Example 3

A solution of 60.81 parts of sodium alpha-naphthoxide in 145 parts of absolute ethanol was added incrementally to 48.46 parts of 1,1,3-trichloropropene at 25° C. with stirring. The reaction mixture was then heated at reflux for about 0.3 hour after which it was cooled, diluted with 2 volumes of water and the non-aqueous layer was separated; the latter, a mixture of liquid and solid, was recrystallized from 95% ethanol to yield 27.8 parts of 3,3-dichloroallyl alpha-naphthyl ether, m. 82.5–83° C.

*Analysis.*—Theory, 28.02% chlorine; found, 27.92%.

*Example 4*

In the manner of Example 3 above 52 parts of 3,3-dichloroallyl alpha-2,4-dichloronaphthyl ether was prepared from 72.69 parts of 1,1,3-trichloropropene and 141.03 parts of sodium 2,4-dichloro alpha - 2,4 - dichloronaphthoxide; m. 75–76° C.

*Analysis.*—Theory, 44.04% chlorine; found, 43.51%.

*Example 5*

A solution of 101.77 parts of 1,1,3-trichloropropene and 44.1 parts of potassium sulfide in about 240 parts of 95% ethanol is refluxed, with stirring, for 14 hours. The reaction mixture was then cooled and diluted with 2 volumes of water. The non-aqueous layer was separated, dried and finally evacuated at 45° C./22 mm. to remove solvent and unreacted 1,1,3-trichloropropene. The liquid residue amounting to 79.8 parts is 3,3-dichloroallyl sulfide.

*Analysis.*—Theory, 12.72% S; found 12.53%.

Having thus described our invention, what we claim and desire to protect by Letters Patent is:

1. 3,3-dichloroallyl p-chlorophenyl ether.
2. 3,3-dichloroallyl alpha-naphthyl ether.
3. 3,3-dihalogeno-2-propenyl aryl ethers and thioethers of the formula $$X_2C=CH-CH_2-M-R^*$$

where M is from the class consisting of oxygen and sulfur; R* being an aryl radical; X representing halogen from the group consisting of chlorine, bromine and fluorine.

4. 3,3-dichloroallyl aryl ethers.

ELBERT C. LADD.
MERLIN P. HARVEY.

REFERENCES CITED

The following references are of record in the file of this patent:

UNITED STATES PATENTS

| Number | Name | Date |
|---|---|---|
| 2,102,611 | Carothers et al. | Dec. 21, 1937 |
| 2,425,426 | Joyce | Aug. 12, 1947 |
| 2,465,061 | Cass | Mar. 22, 1949 |
| 2,477,342 | McBee et al. | July 26, 1949 |
| 2,502,355 | Usteri et al. | Mar. 28, 1950 |

OTHER REFERENCES

Jacob: Bull. Soc. Chim., 7, 581–6 (1940), C. A. 36, 3508.